US006656440B2

United States Patent
Takashina et al.

(10) Patent No.: US 6,656,440 B2
(45) Date of Patent: Dec. 2, 2003

(54) EXHAUST GAS DESULFURIZING METHOD AND SYSTEM THEREFOR

(75) Inventors: Toru Takashina, Hiroshima-ken (JP); Naohiko Ukawa, Hiroshima-ken (JP); Kenji Inoue, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 134 days.

(21) Appl. No.: 09/914,778

(22) PCT Filed: Jan. 12, 2001

(86) PCT No.: PCT/JP01/00105
§ 371 (c)(1),
(2), (4) Date: Sep. 5, 2001

(87) PCT Pub. No.: WO01/51180
PCT Pub. Date: Jul. 19, 2001

(65) Prior Publication Data
US 2002/0168311 A1 Nov. 14, 2002

(30) Foreign Application Priority Data
Jan. 14, 2000 (JP) ........................................ 2000-005614

(51) Int. Cl.$^7$ .............................................. B01D 53/50
(52) U.S. Cl. .................. 423/243.08; 423/555; 422/168; 422/187; 422/234
(58) Field of Search ............................ 423/243.08, 555; 422/168, 187, 234

(56) References Cited

U.S. PATENT DOCUMENTS

| 3,972,980 A | | 8/1976 | Lowell ........................ 423/242 |
| 5,635,149 A | * | 6/1997 | Klingspor et al. ...... 423/243.08 |
| 6,197,200 B1 | * | 3/2001 | College et al. ............. 210/695 |

FOREIGN PATENT DOCUMENTS

| EP | 0 442 074 A1 | * | 8/1991 | ........... B01D/53/34 |
| JP | 6-343824 A | | 12/1994 | |
| JP | 10-137539 A | | 5/1998 | |
| JP | 11-147022 A | | 6/1999 | |

OTHER PUBLICATIONS

T. Arai, et al., Mitsubishijyuko–Giho, vol. 27, No. 4, pp. 1–6, "Present Situation and Development Trend of Desulfurization Technology", Jul. 1990 (with English Abstract).

T. Shinoda, MitsubishijyukoGiho, vol. 33, No. 5, pp. 334–337, "Introduction of Desulfurization Plant for Egat Mae Moh in Thailand", Sep. 1996 (with English Abstract).

* cited by examiner

Primary Examiner—Stanley S. Silverman
Assistant Examiner—Timothy Vanoy
(74) Attorney, Agent, or Firm—Oblon, Spivak, McClelland, Maier & Neustadt, P.C.

(57) ABSTRACT

A method and system for desulfurizing flue gas in which desulfurization is effected by bringing absorbent slurry containing limestone into contact with flue gas. The method classifies absorbent slurry extracted from a desulfurization absorber, returns a fine-side fluid to the desulfurization absorber, and sends a coarse-side fluid to a solid-liquid separator. Supplied limestone powder is mixed to yield limestone slurry by a solid-liquid mixer, and the limestone slurry is classified, sending the small-particle fluid component thereof to the desulfurization absorber, and sending the large-particle fluid component thereof to a limestone fine grinder. And, limestone contained in the large-particle fluid component is finely ground by the limestone fine grinder and the finely ground limestone is sent to the desulfurization absorber. According to the desulfurization method and system, the concentration of limestone in the desulfurization absorber is increased while the concentration of residual limestone in by-product gypsum is kept low, whereby the desulfurization performance of the absorber can be enhanced, and the operation power for the whole system can be decreased.

10 Claims, 7 Drawing Sheets

EXHAUST GAS DESULFURIZING METHOD AND SYSTEM THEREFOR

TECHNICAL FIELD

The present invention relates to a desulfurization method and a desulfurization system (desulfurization equipment) for removing sulfur oxides in flue gas and, more particularly, to a desulfurization method and a desulfurization system that enhance the desulfurization performance of a desulfurization absorber and contribute to a decrease in operation power for the whole system.

BACKGROUND ART

In a flue gas desulfurization system, as a raw material for limestone slurry used for a desulfurization absorber, rock-like limestone or limestone powder prepared already by grinding at a mine etc. is used. Usually, in Japan, flue gas desulfurization systems are often operated by using ground limestone powder as the raw material.

For example, in Japan, a lime-gypsum process flue gas desulfurizer uses slurry containing limestone powder as an absorbent for sulfur dioxide. As the particle size of limestone powder in absorbent slurry decreases and the dissolution rate increases, the limestone powder dissolves faster and the alkalinity of absorbent increases, so that the removal ratio of sulfur dioxide gas, which is an acid gas, increases. The reason for this is that acid-alkali reaction takes place in the desulfurization absorber, so that as the alkalinity of absorbent increases, the absorbent becomes easier to introduce acid.

On the other hand, grinding for decreasing limestone size requires power, and the power consumes larger amounts of energy as the particle size of ground powder decreases. Conventionally, therefore, the power for grinding limestone and the power for operating the desulfurizer have been compared, and as the result, limestone having an average particle size of about 10 to 20 $\mu$m, for example, has been used.

However, there has been a problem in that a high circulation flow rate of absorbent in the desulfurization absorber is needed to achieve a desired removal ratio of sulfur dioxide.

On the other hand, the limestone powder has a fixed particle size distribution. Even if the average particle size is 10 to 20 $\mu$m, not all particles exist in this range, and the particle size has a fixed distribution. It is mainly a large-particle component in the particle size distribution that exerts an adverse influence of limestone in the desulfurizer. Specifically, 90 to 95% of limestone put into the desulfurizer dissolves in the absorbent, and the remaining 5 to 10% of limestone exists in the absorbent and acts as a solid.

Thereupon, it is disadvantageous in terms of power to grind all limestone into a powder form. In the case where all particles are made fine, if the powder is made finer than 10 $\mu$m, there arises a problem in that extremely high power is required for grinding. In this case, power far higher than the power for operating the flue gas desulfurization system is required for grinding.

DISCLOSURE OF THE INVENTION

To solve the above problems, the inventors conducted studies earnestly to develop a desulfurization method in which the concentration of limestone in a desulfurization absorber is increased while the concentration of residual limestone in by-product gypsum is kept low, by which the desulfurization performance of the absorber can be increased, and the operation power for the whole system can be reduced.

As the result of the studies, the inventors found that in a flue gas desulfurization method in which desulfurization is accomplished by bringing absorbent slurry containing limestone into contact with flue gas, large particles in the limestone slurry are ground into fine particles at the preceding stage of the desulfurization absorber, by which the aforementioned problems are solved. The present invention has been completed from this point of view.

The present invention provides a method for desulfurizing flue gas in which desulfurization is effected by bringing absorbent slurry containing limestone into contact with flue gas, comprising the steps of classifying absorbent slurry extracted from a desulfurization absorber, returning a fine-side fluid containing much limestone to the desulfurization absorber, and sending a coarse-side fluid containing much gypsum to a solid-liquid separator; mixing supplied limestone powder to yield limestone slurry by a solid-liquid mixer or supplying supplied limestone to a limestone grinder to yield limestone slurry; classifying the limestone slurry, sending the small-particle fluid component thereof to the desulfurization absorber, and sending the large-particle fluid component thereof to a limestone fine grinder; and finely grinding limestone contained in the large-particle fluid component by the limestone fine grinder and sending the finely ground limestone to the desulfurization absorber.

In the above-described method for desulfurizing flue gas, there can be used a mode in which some of filtrate obtained by the solid-liquid separator is sent to the solid-liquid mixer or limestone grinder to mix with limestone powder or limestone, or a mode in which the absorbent slurry extracted from the desulfurization absorber is sent to a gypsum dissolution tank after being thickened, and is classified after make-up water is supplied to the gypsum dissolution tank.

Also, the present invention provides a system for desulfurizing flue gas in which desulfurization is effected by bringing absorbent slurry into contact with flue gas, comprising a desulfurization absorber for desulfurizing flue gas by means of circulation of absorbent slurry; an absorbent slurry classifier for classifying absorbent slurry extracted from the desulfurization absorber and sending a fine-side fluid to the desulfurization absorber;

a solid-liquid separator for separating a coarse-side fluid separated by the absorbent slurry classifier into a gypsum component and a filtrate component; a solid-liquid mixer for mixing supplied limestone powder to yield limestone slurry, or a limestone grinder for grinding supplied limestone to yield limestone slurry; a limestone slurry classifier for classifying the limestone slurry into a small-particle fluid component sent to the desulfurization absorber and a large-particle fluid component subjected to fine grinding; and a limestone fine grinder for finely grinding the large-particle fluid component and sending the finely ground component to the desulfurization absorber.

In the above-described system for desulfurizing flue gas, there can be used a mode in which some of filtrate obtained by the solid-liquid separator is sent to the solid-liquid mixer or limestone grinder to mix with limestone powder or limestone, or a mode in which a thickener and a gypsum dissolution tank to which make-up water is supplied are further provided at the preceding stage of the absorbent slurry classifier for sending absorbent slurry extracted from the desulfurization absorber.

In the present invention, two classifying steps, a step of classifying absorbent slurry extracted from the desulfurization absorber (absorbent slurry classifier) and a step for classifying limestone slurry obtained by grinding limestone of raw material (limestone slurry classifier), are combined.

In the absorbent slurry classifier, after absorbent slurry is classified, the fine-side fluid containing much limestone is returned to the desulfurization absorber, and the coarse-side fluid containing much gypsum is sent to the solid-liquid separator. On the other hand, in the limestone slurry classifier, after the limestone slurry mixed with filtrate or make-up water is classified, the small-particle fluid component is sent to the desulfurization absorber, and the large-particle fluid component is set to the limestone fine grinder.

In particular, in the present invention, only large particles in limestone slurry is separated by the limestone slurry classifier (cyclone etc.) and is charged into the limestone fine grinder to be finely grounded. The limestone slurry in which large particles have been ground and removed is charged into the desulfurization absorber after being mixed with slurry. Thus, large particles have been removed from the limestone slurry introduced into the desulfurization absorber, so that the operation efficiency of the desulfurization absorber can be improved, and the power for the desulfurization absorber can be decreased. Also, the classifying operation of the absorbent slurry classifier can be enhanced, and the purity of the obtained gypsum can be made higher.

As described above, according to the present invention, only coarse limestone is classified on the downstream side of the limestone grinder and is recirculated to the grinder, so that excess grinding power is not needed, whereby the power of grinder can be decreased significantly.

Also, since coarse limestone can be prevented from being supplied to the desulfurization absorber, in the absorbent slurry classifier, the separation efficiency between gypsum, which is a by-product in the absorber, and residual limestone is improved dramatically. As a result, the concentration of limestone in the absorber can be increased while the concentration of residual limestone in the by-product gypsum is kept low. Since the limestone is made fine powder, the dissolution rate is increased, and the desulfurization performance of absorber is enhanced.

Hereinafter, the present invention will be described in detail by way of embodiments. The scope of the present invention is not subject to any restriction by the embodiments.

Figure 1:
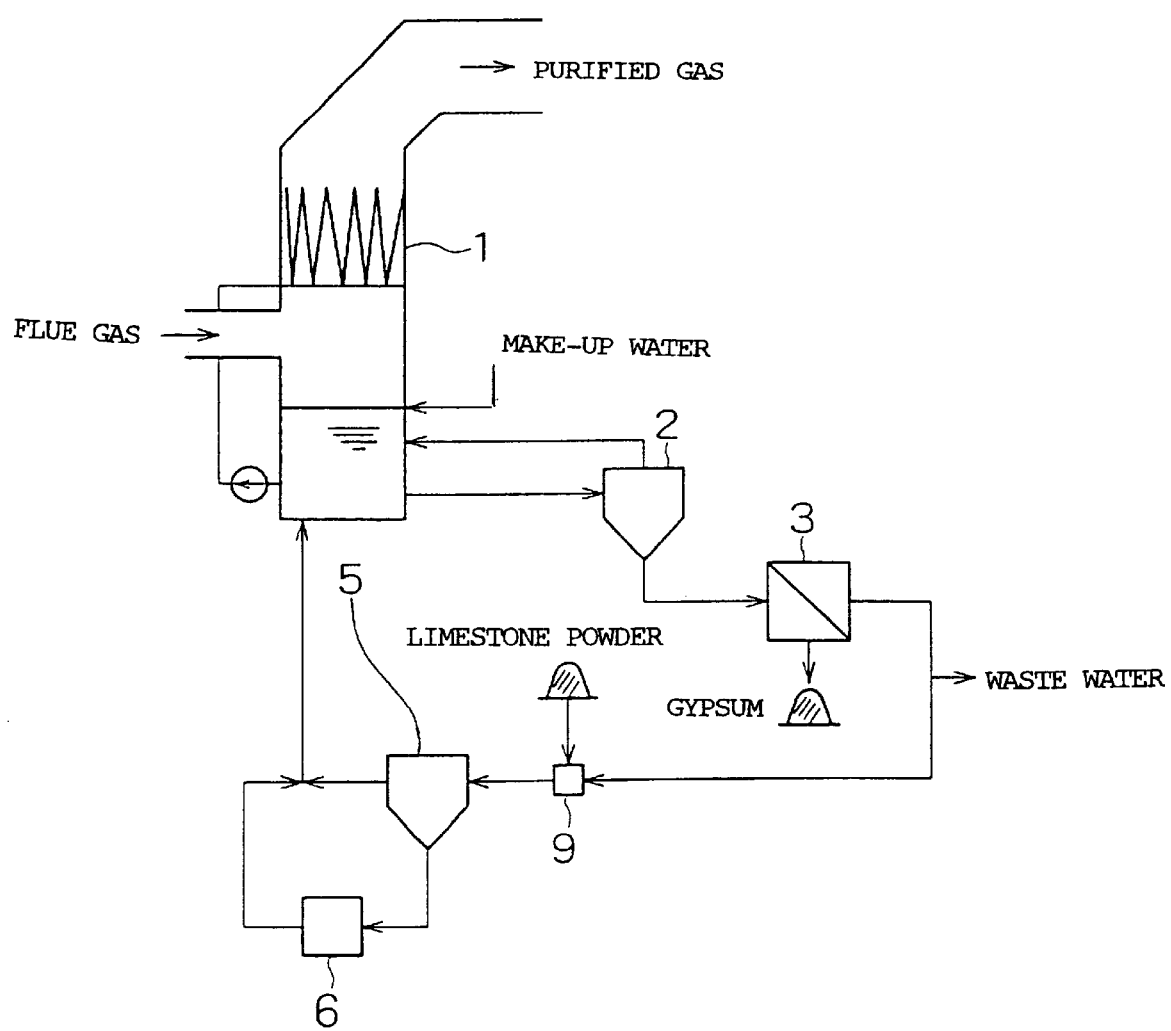
FIG. 1 is a schematic view of a flue gas desulfurization system in accordance with a first embodiment of the present invention.

In the above figures, reference numeral 1 denotes a desulfurization absorber, 2 denotes an absorbent slurry classifier, 3 denotes a solid-liquid separator, 4 denotes a limestone grinder, 5 denotes a limestone slurry classifier, 6 denotes a limestone fine grinder, 7 denotes a thickener, 8 denotes a gypsum dissolution tank, and 9 denotes a solid-liquid mixer.

BEST MODE FOR CARRYING OUT THE INVENTION

In the present invention, besides limestone powder ground already at a mine etc., unground rock-like limestone with a diameter of, for example, 10 to 15 mm can be used as a raw material. Hereinafter, first to third embodiments relate to a system using limestone powder as a raw material, and a fourth embodiment relates to a system using rock-like limestone. Specific modes of a method or a system in accordance with the present invention will be described with reference to the accompanying drawing, and the present invention is not limited to the embodiments described below.

First Embodiment

FIG. 1 is a schematic view showing one example of a desulfurization system in accordance with the present invention. The system of a first embodiment includes a desulfurization absorber 1, an absorbent slurry classifier 2 for classifying absorbent slurry extracted from the desulfurization absorber 1, a solid-liquid separator 3, a solid-liquid mixer 9, a limestone slurry classifier 5 for classifying limestone slurry, and a limestone fine grinder 6. In the recycle type system as shown in FIG. 1, some of filtrate yielded by solid-liquid separation is sent to the solid-liquid mixer 9 and is used as limestone slurry.

In the desulfurization absorber 1, absorbent slurry is sent from a tank portion at the lower part to a blowoff portion at the upper part by a pump. The absorbent slurry comes into contact with flue gas introduced at any time into the absorber 1, and reaction is repeated. After sulfur oxides contained in the flue gas are decreased or removed, the treated flue gas is discharged as purified gas from the upper part of the absorber 1. On the other hand, gypsum etc. produced by the reaction with S components in the flue gas is contained in a tank at the lower part. In the desulfurization absorber 1, slurry containing the gypsum with a percentage of about 95% is usually circulated as absorbent slurry by a pump or the like. The reason for this is that the purity of gypsum obtained at the later stage is kept at a fixed value, and also limestone is used effectively and the amount of limestone thrown away by the solid-liquid separation is decreased. Also since water in slurry liquid evaporates, make-up water is introduced into the absorber 1.

The absorbent slurry extracted from the desulfurization absorber 1 is sent to the absorbent slurry classifier 2 to be concentrated and classified. After this classification, a fine-side fluid is returned to the desulfurization absorber 1. The fine-side fluid contains a large amount of limestone. On the other hand, a coarse-side fluid containing much solid content is sent to the solid-liquid separator 3 provided at the following stage. The coarse-side fluid contains a large amount of gypsum. As the absorbent slurry classifier 2, a liquid cyclone or the like is preferably used.

In the solid-liquid separator 3 to which the coarse-side fluid containing much gypsum is sent, the fluid is separated into a gypsum component and a filtrate component. The gypsum component obtained in the present invention can be utilized as a product with a fixed or higher purity. The filtrate exceeding a necessary amount is disposed of as waste water, but a necessary amount of filtrate is sent to the solid-liquid mixer 9 to be recycled. As the solid-liquid separator 3, a belt filter, a centrifugal dehydrator, or the like can be used.

In this embodiment, since the supplied limestone is limestone powder already ground, the lime stone powder is charged as it is into the solid-liquid mixer 9 together with some of filtrate sent from the solid-liquid separator 3 to yield limestone slurry. As the solid-liquid mixer 9, a tank with an agitator is generally used.

This limestone slurry is sent to the limestone slurry classifier 5 on the downstream side, where the limestone slurry is classified into a small-particle fluid component (slurry component mainly containing small particles) that is sent as it is to the desulfurization absorber 1 and a large-particle fluid component (slurry component mainly containing large particles) that is further subjected to fine grinding. At the stage at which the limestone slurry is classified, the ratio of the small-particle fluid component charged as it is into the desulfurization absorber 1 to the large-particle fluid component sent to the fine grinder 6 for performing grinding operation is usually about 5:5 to 7:3 (small particles: large particles). As the limestone slurry classifier 5, a precipitator such as a cyclone and a levigation separator can be used.

In the limestone fine grinder 6, the large-particle fluid component is finely ground and sent to the desulfurization absorber. Since wet type equipment is used as the limestone fine grinder 6, the fluid component must be prepared into a slurry form on the upstream side. Usually, as in the case of this embodiment, the liquid and limestone are mixed to yield limestone slurry at the preceding stage of the limestone classifier 5 (solid-liquid mixer 9), and then the limestone slurry is classified by the limestone slurry classifier. However, the present invention can be carried out as necessary by a configuration such that after solid-form limestone is classified by a wet type classifier, limestone slurry is yielded and then is charged into the limestone fine grinder.

As the limestone fine grinder 6, for example, a beads mill, a tower mill, or the like, which is a wet type mill, can be used, and for fine grinding, a system in which media for grinding are put therein and then rubbing with the media is utilized is preferably used.

After the slurry is finely ground by the fine grinder 6 and large limestone particles are removed, the slurry is charged into the desulfurization absorber 1 together with the aforementioned small-particle fluid component.

In the above-described desulfurization method in accordance with the present invention, the absorbent slurry (absorbent) is circulated in the flue gas desulfurization absorber 1, and desulfurization is repeated. Some of the liquid is introduced to the absorbent slurry classifier 2, and most gypsum and residual limestone particles exist in the slurry. In the solid-liquid separator 3 on the downstream side, the slurry is separated into gypsum & limestone powder and fluid, and gypsum is separated and recovered in this solid-liquid separation process.

Therefore, when the slurry is sent from the desulfurization absorber 1 to the solid-liquid separator 3 without component control of solid content, the composition of a solid circulating in the desulfurization absorber 1 and the composition of a solid recovered by the solid-liquid separator 3 are almost the same. Specifically, in the solid-liquid separator 3, the liquid component is separated as a filtrate, and the slurry is solidified. When attention is paid to the solid contained in the slurry, the composition does not change in principle.

Regarding the purity of the obtained gypsum, the specifications for purity exist to make products such as cement and gypsum boards from gypsum, and purity lower than a given value decreases the value in use. Usually, the gypsum-to-limestone ratio must be about 95:5. However, in the solid in the desulfurization absorber 1, limestone remaining undissolved, which is principal impurities of gypsum, exists. Therefore, if solid-liquid separation is effected with the limestone existing, the purity of gypsum sometimes becomes lower than the given value so that a product cannot be made from the gypsum.

For this reason, when only the interior of the desulfurization absorber 1 is considered, it is desirable to increase the amount of limestone to enhance the desulfurization efficiency by leaving more limestone remaining undissolved, but it is necessary to recover gypsum by using the solid-liquid separator 3. Therefore, conventionally, the amount of limestone capable of being put in the desulfurization absorber 1 has been limited.

In the present invention, the absorbent slurry classifier 2 is provided between the desulfurization absorber 1 and the solid-liquid separator 3, and the absorbent slurry classifier 2 has two functions.

One function of the absorbent slurry classifier 2 is that the absorbent slurry classifier plays a role in concentrating slurry and returning water-soluble components to the absorber 1. That is to say, the absorbent slurry classifier 2 functions as a concentrator for concentrating solid content. The concentration of slurry sent to the absorbent slurry classifier 2 is usually about 30% by weight. The slurry is returned to the desulfurization absorber 1 after the water-soluble components are removed by the classifier, so that the concentration of slurry coming out of the bottom is about 60% by weight. By this function, the operation of the solid-liquid separator 3 on the downstream side is made easy.

The other function of the absorbent slurry classifier 2 is that the composition ratio between gypsum and limestone contained in the solid content itself is changed, by which the concentration of gypsum in the solid content coming out of the bottom is increased.

Generally, gypsum has an average diameter of about 30 to 35 $\mu$m. According to the conventional method, the limestone remaining undissolved has an average particle size of about 20 to 25 $\mu$m, so that the difference in particle size between gypsum and limestone is small. Also, particles have a fixed particle size distribution. Therefore, even if a classifier is provided, it is difficult to sufficiently separate gypsum from limestone in the solid content. For this reason, even if a classifier is provided, the purity of gypsum obtained by the solid-liquid separator 3 does not increase sufficiently, so that the concentration of limestone in the desulfurization absorber 1 cannot be increased. As described above, the solid-liquid separator 3 is a kind of filter for separating solid content from water content, so that the composition ratio in the solid content does not change usually.

In this respect, in the absorbent slurry classifier 2 in accordance with the method and system of the present invention, since limestone of large particle size has been ground and removed by the limestone fine grinder 6, the average particle size of limestone remaining undissolved in the desulfurization absorber 1 is as small as about 9 $\mu$m. On the other hand, the average particle size of gypsum is about 30 to 35 $\mu$m as described above. Therefore, the difference in particle size between gypsum and limestone is large. Furthermore, since particles of large size about equal to that of gypsum have been ground and removed, effective separation is effected by the absorbent slurry classifier 2, thereby enhancing the separation efficiency between gypsum and limestone.

That is to say, the absorbent slurry classifier 2 in accordance with the present invention has a function of separating gypsum from limestone in the solid content as well as a function of returning only the fine-particle component to the desulfurization absorber 1 to concentrate the solid content.

In the water component returned to the desulfurization absorber 1, a large amount of finely ground limestone is contained. Therefore, the concentration of limestone in the desulfurization absorber 1 can be increased while the purity of gypsum obtained by the solid-liquid separator 3 at the following stage is maintained.

Thus, in the present invention, by providing a fine grinding process for limestone, the alkalinity of limestone itself can be improved, and also the concentration of limestone capable of existing in the desulfurization absorber 1 can be increased. By the high concentration of the absorbent slurry, the circulation flow rate of a circulating pump in the absorber 1 can be decreased, so that the pump can be made small in size. Also, if necessary, the purity of the obtained gypsum can be made high.

Second Embodiment

Figure 2:
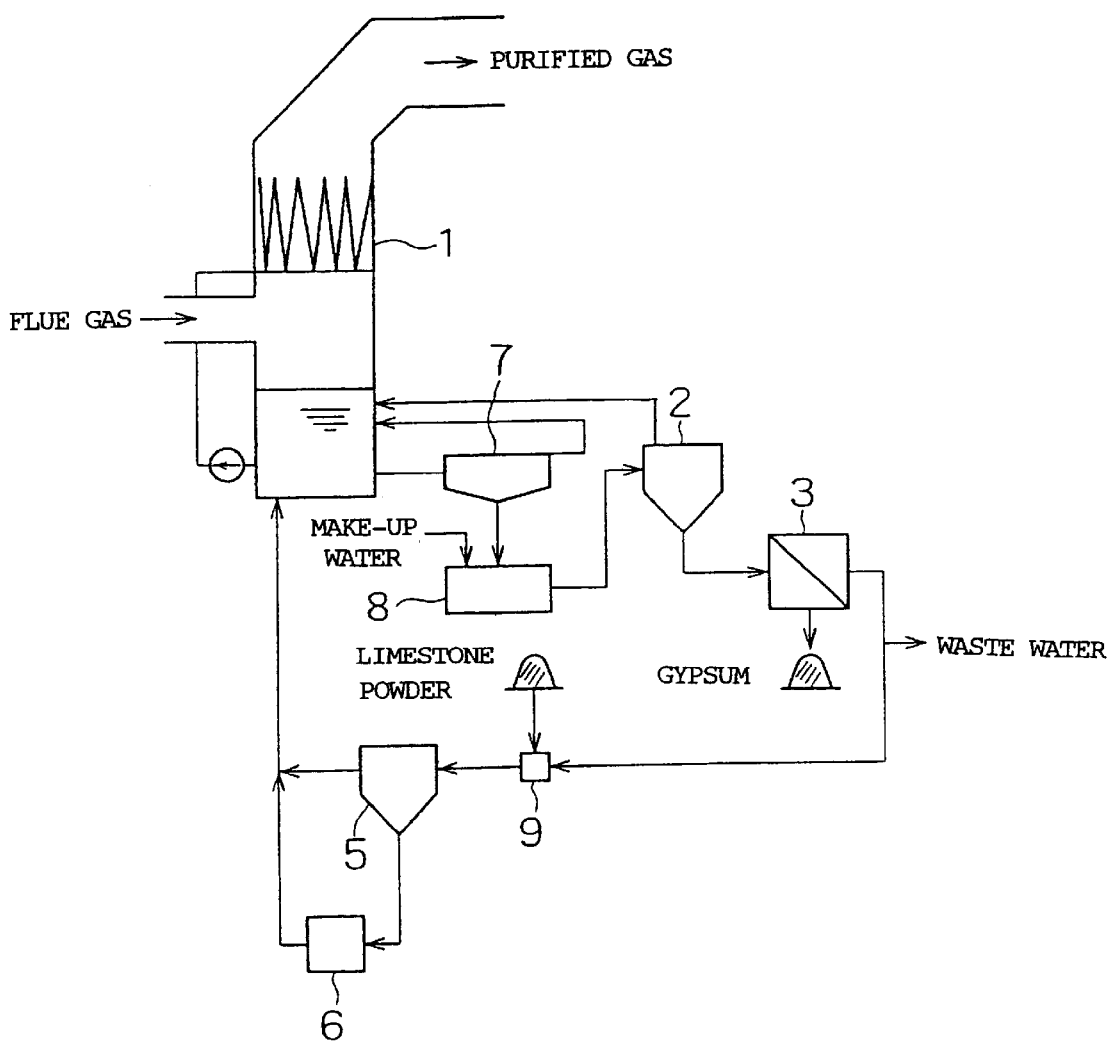
FIG. 2 is a schematic view of a flue gas desulfurization system in accordance with a second embodiment of the present invention.

FIG. 2 is a schematic view showing another example of a desulfurization system in accordance with the present invention. In the system of a second embodiment, a thickener 7 and a gypsum dissolution tank 8 are provided between the desulfurization absorber 1 and the absorbent slurry classifier 2 in the first embodiment, and make-up water is supplied to the gypsum dissolution tank 8. The solution containing limestone and gypsum separated and dissolved by the absorbent slurry classifier 2 is returned to the desulfurization absorber 1, and the slurry coming out of the bottom is sent to the solid-liquid separator 3. The system shown in FIG. 2 is also a recycle type system, and some of filtrate yielded by solid-liquid separation is sent to the solid-liquid mixer 9 and is used as limestone slurry.

Water content in the absorbent slurry is gradually evaporated by the operation of the desulfurizer, so that it is necessary to resupply water at any location. In this embodiment, the gypsum dissolution tank 8 is provided, and make-up water is supplied to this tank. If make-up water is supplied, a margin of dissolution is produced accordingly until the saturated solubility of gypsum is reached, and dissolution proceeds in such a manner that smaller particles in gypsum dissolve earlier.

Thus, small particles of gypsum dissolve in water, so that in the particle size distribution of gypsum, small particles are decreased, and large particles remain in large amounts. That is, gypsum of small particle size, which is about equal to the particle size of limestone, is further removed, which makes a larger difference in particle size between limestone and gypsum. By the change of particle size distribution of gypsum contained in the solid content, the separation efficiency of the absorbent slurry classifier 2 provided at the following stage is further enhanced.

Third Embodiment

Figure 3:
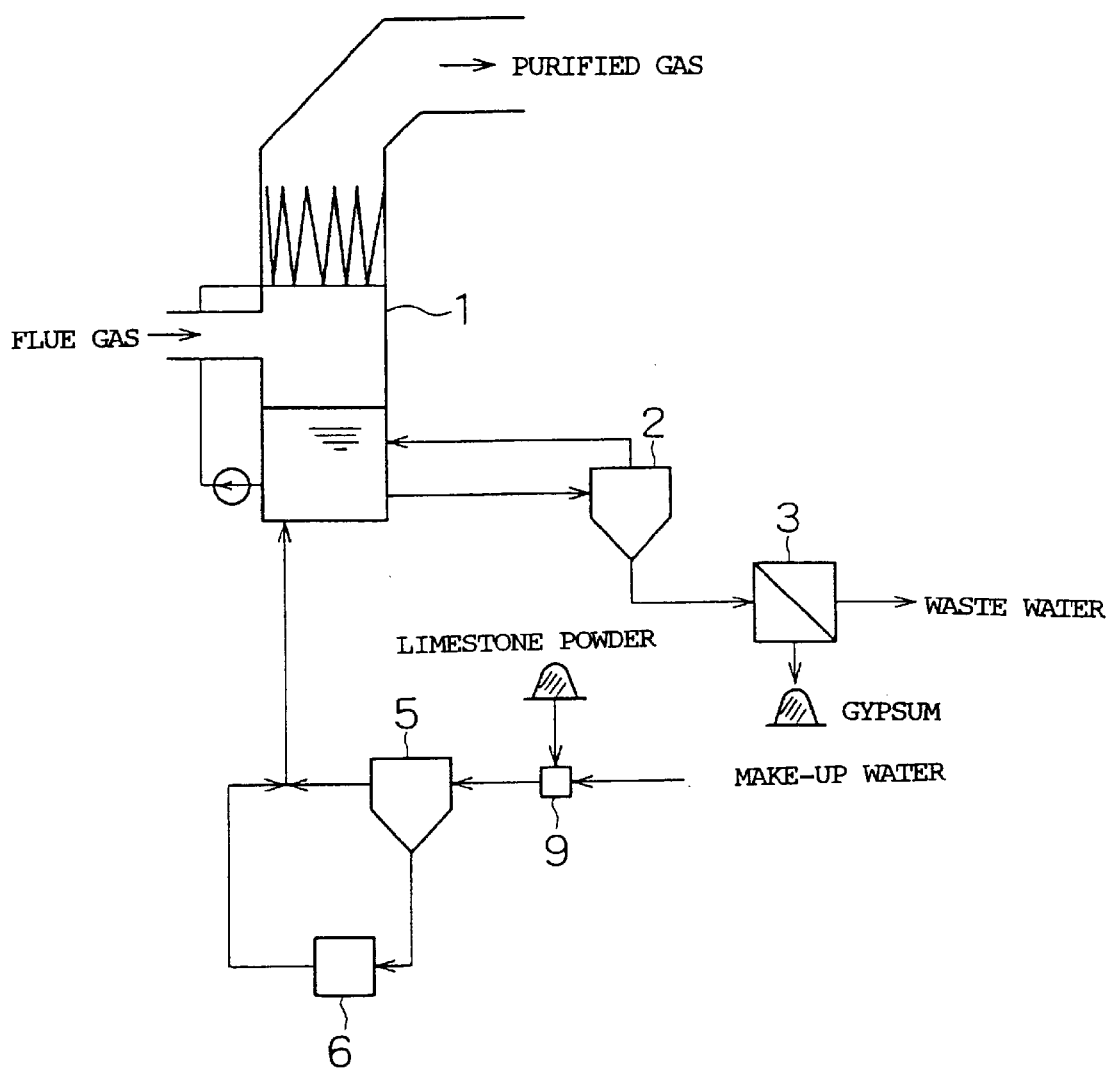
FIG. 3 is a schematic view of a flue gas desulfurization system in accordance with a third embodiment of the present invention.

FIG. 3 is a schematic view showing still another example of a desulfurization system in accordance with the present invention. Instead of the recycle type system of the first embodiment, the system of a third embodiment is a one-path type system in which make-up water is introduced into the solid-liquid mixer 9 at any time without the use of filtrate of the solid-liquid separator 3. In other words, in the system of this embodiment, water for slurry is continuously supplied as make-up water without the circulation of waste water.

Fourth Embodiment

Figure 4:
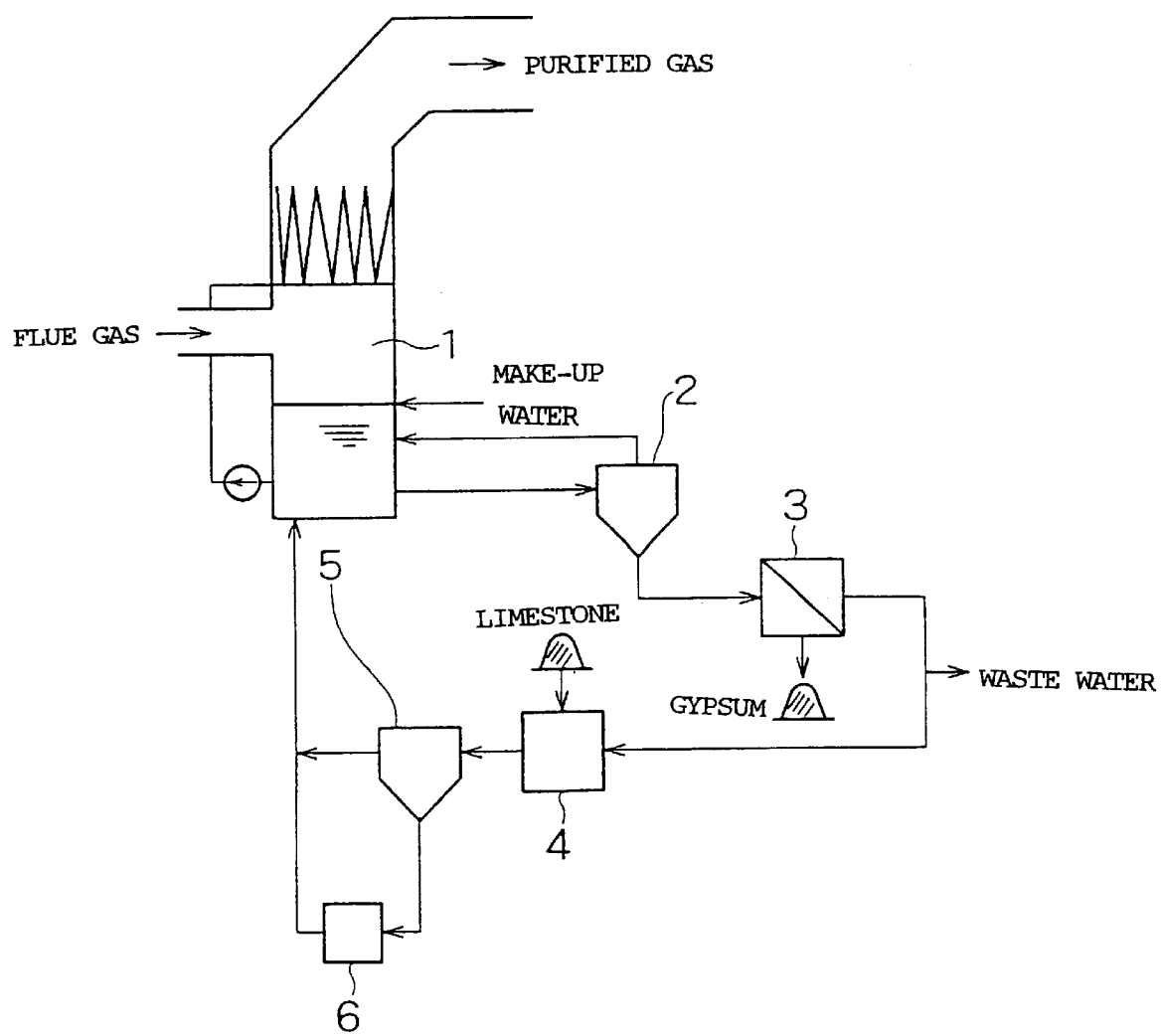
FIG. 4 is a schematic view of a flue gas desulfurization system in accordance with a fourth embodiment of the present invention.
Figure 5:
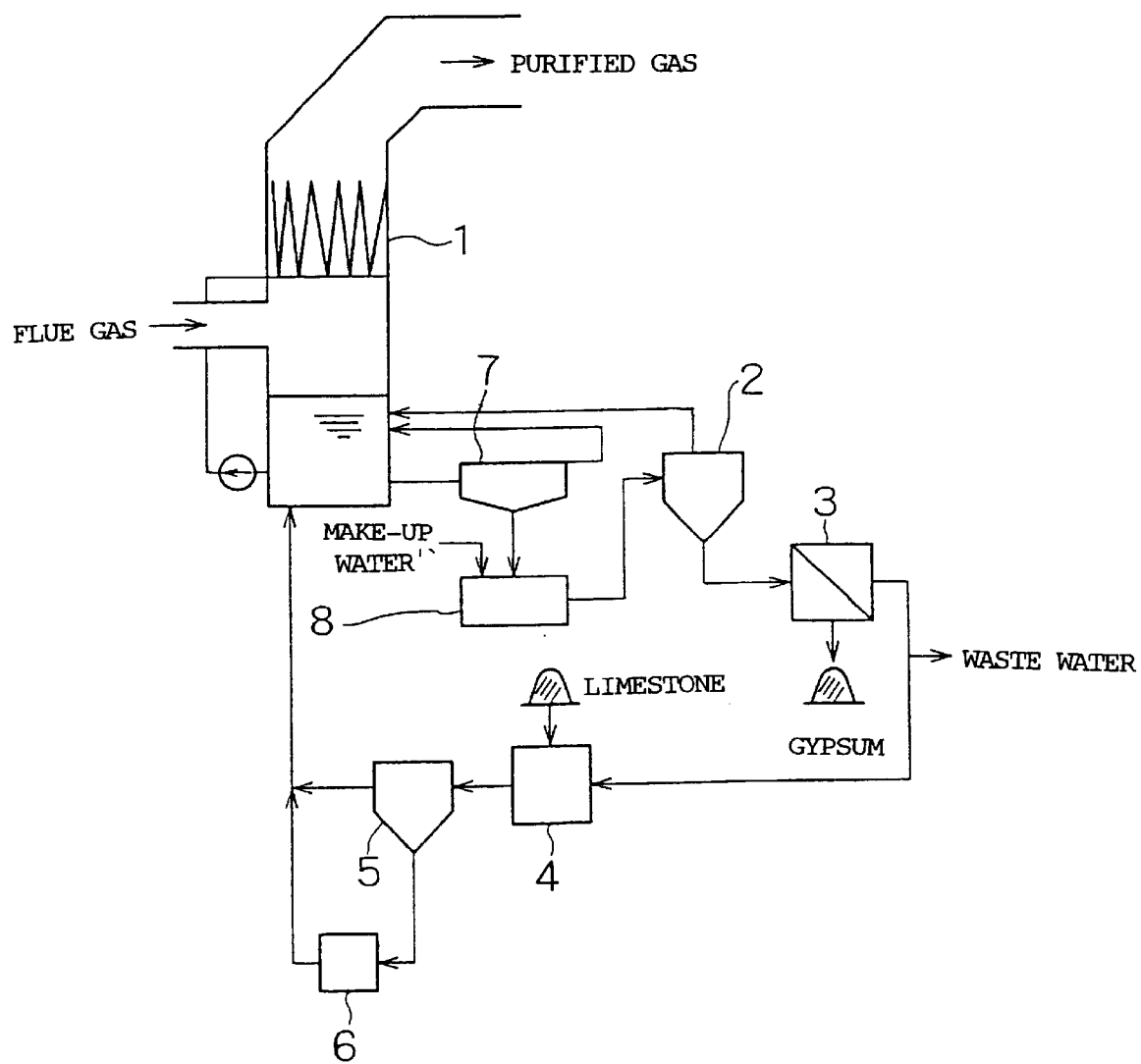
FIG. 5 is a schematic view of a flue gas desulfurization system in accordance with the fourth embodiment of the present invention.
Figure 6:
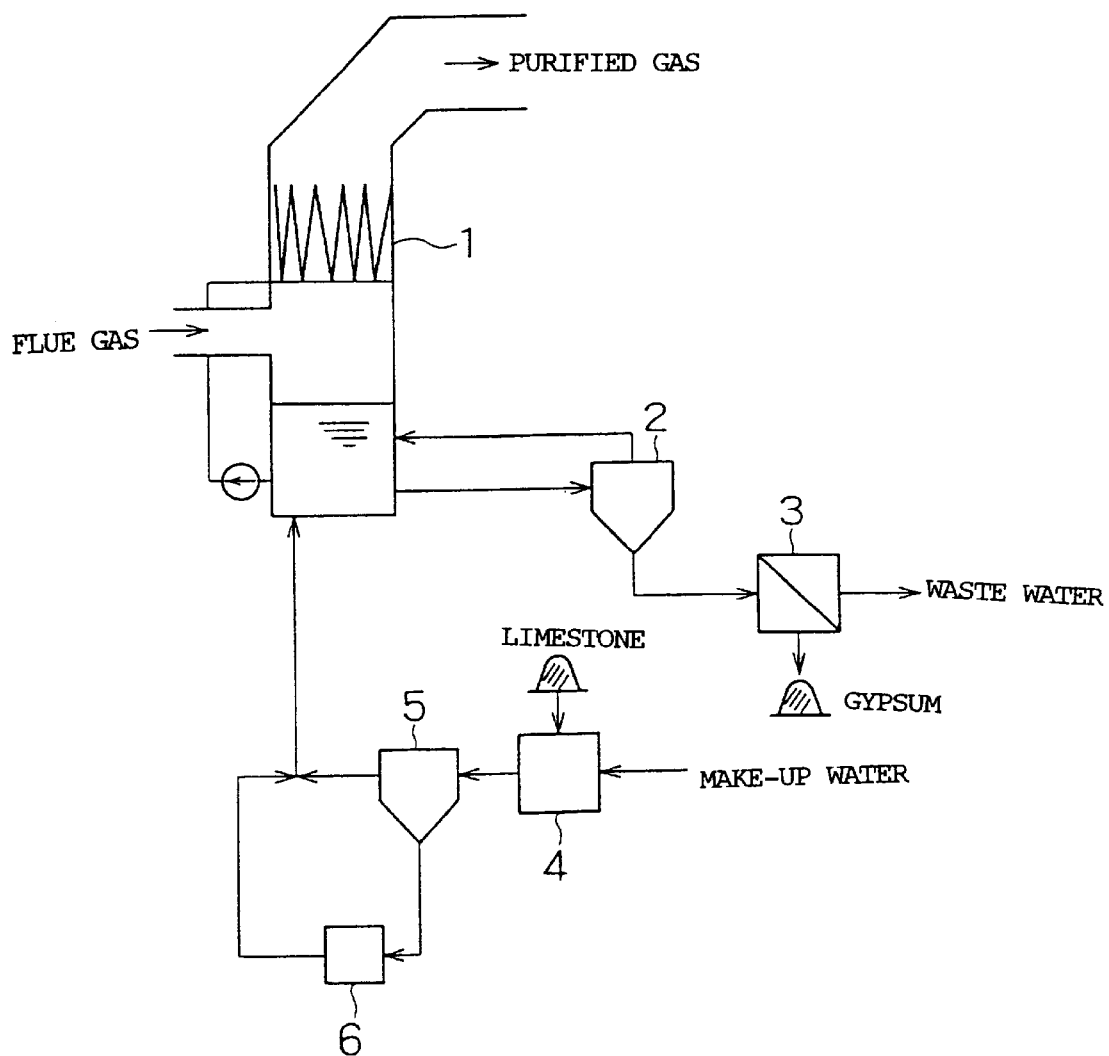
FIG. 6 is a schematic view of a flue gas desulfurization system in accordance with the fourth embodiment of the present invention.

FIGS. 4, 5 and 6 are schematic views showing still another examples of a desulfurization system in accordance with the present invention. In the system of a fourth embodiment, a limestone grinder 4 is provided in place of the solid-liquid mixer 9 in the first to third embodiments. In the fourth embodiment, unground rock-like limestone with a diameter of, for example, 10 to 15 mm can be used as a raw material.

As the limestone grinder 4, a wet type mill is generally used. Water and rock-like limestone are charged into the limestone grinder 4, and are mixed and ground therein. As the water being mixed, some of filtrate discharged from the solid-liquid separator 3 is used (FIGS. 4 and 5), or make-up water supplied from the outside of the system is used (FIG. 6).

When limestone is readily available as rock-like stone, it is advantageous that the limestone grinder 4 for powdering rock-like limestone is provided in the system as in the case of this embodiment, and the grinding treatment of limestone can also be accomplished in the desulfurization line.

As described above, according to the present invention, only coarse limestone is classified on the downstream side of the limestone grinder and is recirculated to the grinder, so that excess grinding power is not needed, whereby the power of grinder can be decreased significantly.

Also, since coarse limestone can be prevented from being supplied to the desulfurization absorber, in the absorbent slurry classifier, the separation efficiency between gypsum, which is a by-product in the absorber, and residual limestone is improved dramatically. As a result, the concentration of limestone in the absorber can be increased while the concentration of residual limestone in the by-product gypsum is kept low. Since the limestone is made fine powder, the dissolution rate is increased, and the desulfurization performance of absorber is enhanced.

Hereinafter, experimental results showing the effects of the present invention will be described in detail by way of examples. The present invention is not subject to any restriction by the examples.

EXAMPLES

Example 1, Comparative Example 1

An experiment was conducted on the desulfurization system (first embodiment) shown in FIG. 1 to confirm the operation power decreasing effect etc. For comparison, an experiment was conducted as comparative example 1 on a system in which slurry is directly sent from the absorber 1 to the solid-liquid separator 3 without the absorbent slurry classifier 2, and slurry is directly sent from the mixer 9 to the absorber 1 without the limestone slurry classifier 5 and the fine grinder 6 in the system shown in FIG. 1. Also, for reference, an experiment was conducted as reference example 1 on a system in which slurry is directly sent from the mixer 9 to the absorber 1 without the limestone slurry classifier 5 and the fine grinder 6 in the system shown in FIG. 1.

The experiments were conducted under the same conditions regarding the flow rate, $SO_2$ concentration, sulfur oxides removal efficiency of flue gas, etc.

Figure 7:
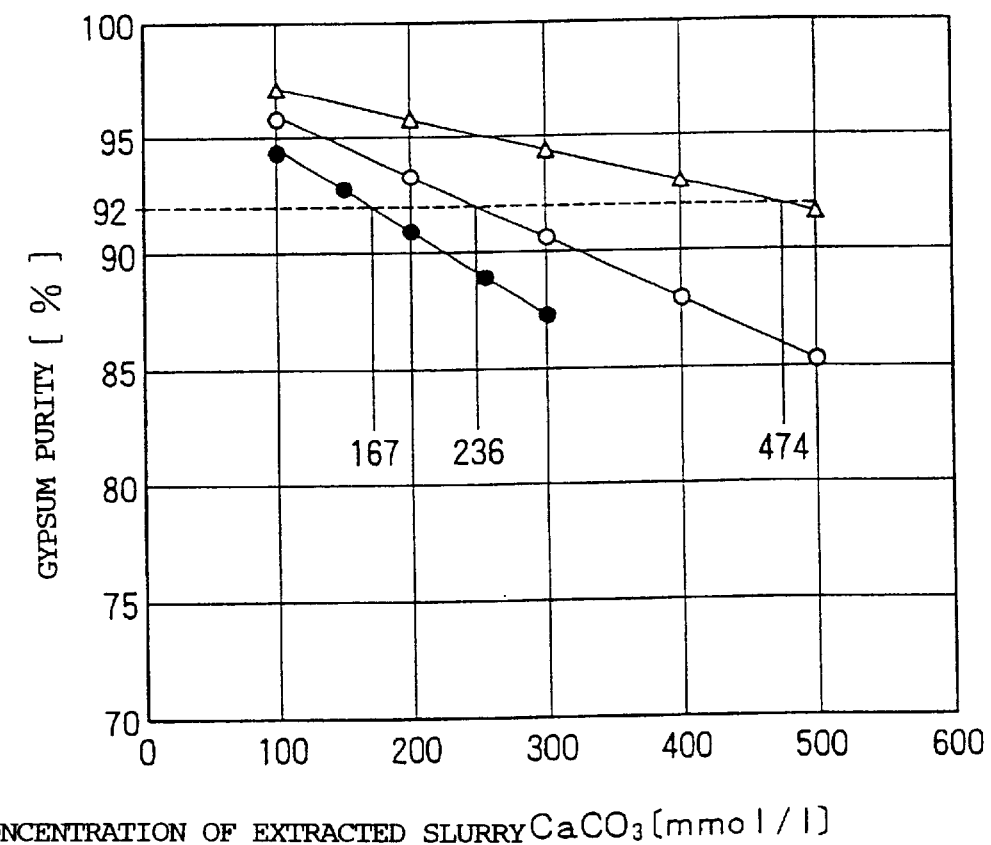
FIG. 7 is a graph showing the relationship between limestone concentration and gypsum purity in slurry in an example.

First, the results of measurement of the concentration of limestone in slurry in the absorber 1 are shown in FIG. 7 (Δ represents example 2, ● represents comparative example 1, and ○ represents reference example 1). From these results, it is found that when comparison is made at the same gypsum purity, for example, on a line on which the requirement for gypsum purity of 92% is met, the concentration of limestone in slurry is increased significantly in the first embodiment of the present invention. In the case where the absorbent slurry classifier 2 is provided in reference example 1, since the particle size distribution is slightly changed by the effect of the classifier, the improvement effect is found to some degree, and the concentration of limestone in slurry is increased.

Thus, in example 1, the concentration of limestone in slurry can be increased to about three times that of comparative example 1. This high concentration can decrease the operation power of the desulfurization absorber 1.

Next, the values of measurement and calculation made to give a difference in operation power in the systems of example 1, comparative example 1, and reference example 1 are given in Table 1.

TABLE 1

| Item | | Example 1 | Comparative example 1 | Reference example 1 |
|---|---|---|---|---|
| Limestone concentration | mmol/l | 474 | 167 | 236 |
| Consumption of limestone | kg/h | 48.6 | 48.6 | 48.6 |
| Quantity of finely ground limestone | kg/h | 17.9 | — | — |
| Circulation quantity in absorber | m³/h | 197 | 225 | 217 |
| Gas pressure loss | mmH$_2$O | 90 | 106 | 101 |
| Pump power | kW | 11.5 | 14.5 | 13.6 |
| Fan power | kW | 12.7 | 14.8 | 14.2 |
| Finely grinding power | kW | 0.9 | — | — |
| Total power | kW | 25.1 | 29.3 | 27.8 |
| Decrease in power | kW | 4.2 | — | 1.5 |

In this table, calculation was made on the assumption that the fine grinding power is 50 kWh/ton. The quantity of finely ground limestone is 36.9% of the quantity of limestone used.

The limestone concentration means the concentration of limestone circulating in the absorber, and the consumption of limestone means the quantity of limestone needed when the plant is operated. The quantity of finely ground limestone means the quantity of limestone branching to a fine grinding cycle in example 1, and the fine grinding power means the power needed for the fine grinder.

The circulation quantity of slurry liquid circulated by the pump in the desulfurization absorber decreased from 225 m³/h of comparative example 1 to 197 m³/h.

Also, the pressure loss of flue gas decreased from 106 to 90 mmH$_2$O. This is because the decrease in circulation flow rate of slurry liquid decreased the pressure loss of flue gas contacting in the absorber. That is, since the rate of production of resistance to flue gas flow can be decreased by the slurry liquid, the gas is made easy to flow. In the flue gas treatment system in accordance with the present invention, since a large amount of gas is sent into the system, the fan power needed for the gas flow can be kept low by the decrease in pressure loss. The pump power needed for the circulation of slurry in the absorber is also decreased.

By the power decreasing effect shown in Table 1, in example 1, the total power could be decreased by about 15% as compared with the system of comparative example 1.

According to the method in accordance with the present invention, since the concentration of absorbent slurry can be increased, the same effect can be achieved even if the circulation by the pump is decreased, and the power load of the pump and fan can be decreased significantly. From this fact, it was found that the power decreasing effect in the desulfurization absorber etc. exceeding the increase in power caused by the adoption of the fine grinder can be anticipated in the present invention.

The above is a description of the embodiments and example of the present invention. These embodiments and example are provided for ease of understanding of the present invention, and do not restrict the scope of the present invention.

What is claimed is:

1. A method for desulfurizing flue gas in which desulfurization is effected by bringing absorbent slurry containing limestone into contact with flue gas, comprising the steps of:

classifying absorbent slurry extracted from a desulfurization absorber, returning a fine-side fluid to said desulfurization absorber, and sending a course-side fluid to a solid-liquid separator;

mixing supplied limestone powder and some of filtrate obtained by said solid-liquid separator to yield limestone slurry by a solid-liquid mixer;

classifying said limestone slurry, sending a small-particle fluid component thereof to said desulfurization absorber, and sending a large-particle fluid component thereof to a limestone fine grinder; and finely grinding limestone contained in said large-particle fluid component by said limestone fine grinder and sending the finely ground limestone to said desulfurization absorber.

2. A method of desulfurizing flue gas in which desulfurization is effected by bringing absorbent slurry containing limestone into contact with flue gas, comprising the steps of:

classifying absorbent slurry extracted from a desulfurization absorber, returning a fine-side fluid to said desulphurization absorber, and sending a coarse-side fluid to a solid-liquid separator;

supplying supplied limestone to a limestone grinder to yield limestone slurry;

classifying said limestone slurry, sending a small-particle fluid component thereof to said desulfurization absorber, and sending a large-particle fluid component thereof to a limestone fine grinder; and finely grinding limestone contained in said large-particle fluid component by said limestone fine grinder and sending the finely ground limestone to said desulfurization absorber.

3. The method for desulfurizing flue gas according to claim 1, wherein some of filtrate obtained by said solid-liquid separator is sent to said fine limestone grinder to mix with limestone.

4. The method for desulfurizing flue gas according to claim 1, further comprising the steps of:

thickening the absorbent slurry extracted from said desulfurization absorber, sending the thickened absorbent slurry to a gypsum dissolution tank after being thickened, and supplied supplying make-up water to said gypsum dissolution tank.

5. A system for desulfurizing flue gas in which desulfurization is effected by bringing absorbent slurry into contact with flue gas, comprising:

a desulfurization absorber adapted to desulfurize flue gas by circulation of absorbent slurry;

an absorbent slurry classifier adapted to classify absorbent slurry extracted from said desulfurization absorber and to send a fine-side fluid to said desulfurization absorber;

a solid-liquid separator adapted to separate a coarse-side fluid separated by said absorbent slurry classifier into a gypsum component and a filtrate component;

a solid-liquid mixer adapted to mix supplied limestone powder and a portion of the filtrate to yield limestone slurry;

a limestone slurry classifier adapted to classify said limestone slurry into a small-particle fluid component to be sent to said desulfurization absorber and a large-particle fluid component to be subjected to fine grinding; and a limestone fine grinder adapted to finely grind said large-particle fluid component and to send the finely ground component to said desulfurization absorber.

6. A system for desulfurizing flue gas in which desulfurization is effected by bringing absorbent slurry into contact with flue gas, comprising:

a desulfurization absorber adapted to desulfurize flue gas by circulation of absorbent slurry;

an absorbent slurry classifier adapted to classify absorbent slurry extracted from said desulfurization absorber and to send a fine-side fluid to said desulfurization absorber;

a solid-liquid separator adapted to separate a coarse-side fluid separated by said absorbent slurry classifier into a gypsum component and a filtrate component;

a limestone grinder adapted to grind supplied limestone to yield limestone slurry;

a limestone slurry classifier adapted to classify said limestone slurry into a small-particle fluid component to be sent to said desulfurization absorber and a large-particle fluid component to be subjected to fine grinding; and a limestone fine grinder adapted to finely grind said large-particle fluid component and to send the finely ground component to said desulfurization absorber.

7. The method for desulfurizing flue gas according to claim 2, wherein some of filtrate obtained by a solid-liquid separator is sent to said solid-liquid mixer or limestone grinder to mix with limestone powder or limestone.

8. The method for desulfurizing flue gas according to claim 2, further comprising the steps of:

thickening the absorbent slurry extracted from said desulfurization absorber, sending the thickened absorbent slurry to a gypsum dissolution tank after being thickened, and supplying make-up water to said gypsum dissolution tank.

9. A method for desulfurizing flue gas, comprising:

classifying absorbent slurry extracted from a desulfurization absorber into a first fluid to be returned to the desulfurization absorber and a second fluid;

separating the second fluid to obtain a filtrate;

mixing limestone powder and the filtrate to obtain limestone slurry;

classifying the limestone slurry into a relatively smaller particle fluid to be sent to the desulfurization absorber and a relatively larger particle fluid;

grinding limestone contained in the relatively larger particle fluid to obtain ground limestone; and sending the ground limestone to the desulfurization absorber.

10. A method of desulfurizing flue gas, comprising:

classifying absorbent slurry extracted from a desulfurization absorber into a first fluid to be returned to the desulfurization absorber and a second fluid;

grinding limestone with a first grinder to obtain limestone slurry;

classifying the limestone slurry into a relatively smaller particle fluid to be sent to the desulfurization absorber and a relatively larger particle fluid;

grinding limestone contained in the relatively larger particle fluid with a second grinder to obtain ground limestone; and sending the ground limestone to the desulfurization absorber.

* * * * *